United States Patent [19]

Lewis et al.

[11] Patent Number: 4,782,659
[45] Date of Patent: Nov. 8, 1988

[54] VARIABLE AREA AIRCRAFT AIR INTAKE

[75] Inventors: William J. Lewis, Somerset; Clifford S. Woodward, Bristol, both of England

[73] Assignee: Rolls-Royce plc, London, England

[21] Appl. No.: 73,157

[22] Filed: Jul. 14, 1987

[30] Foreign Application Priority Data

Jul. 25, 1986 [GB] United Kingdom ............... 8618167

[51] Int. Cl.$^4$ ................................................ F02K 3/02
[52] U.S. Cl. ................................. 60/226.1; 60/226.3; 60/229; 60/39.161; 137/15.1
[58] Field of Search ................ 60/226.1, 229, 232, 60/263, 226.3, 225, 39.161; 137/15.1; 239/265.27, 265.29; 244/53 B, 12.5

[56] References Cited

U.S. PATENT DOCUMENTS

| 3,430,640 | 3/1969 | Lennard | 137/15.1 |
| 3,913,321 | 10/1975 | Snell | 60/226.3 |
| 4,007,891 | 2/1977 | Sorensen et al. | 137/15.1 |
| 4,038,818 | 8/1977 | Snell | 60/226.3 |

FOREIGN PATENT DOCUMENTS

| 890703 | 3/1962 | United Kingdom . |
| 890547 | 3/1962 | United Kingdom . |
| 1102571 | 2/1968 | United Kingdom . |
| 1274026 | 5/1972 | United Kingdom . |
| 2155413 | 9/1985 | United Kingdom . |

OTHER PUBLICATIONS

Space/Aeronautics, "Inlets for Supersonic Aircraft", May 1967, pp. 92–99.

Primary Examiner—Donald E. Stout
Attorney, Agent, or Firm—Parkhurst, Oliff & Berridge

[57] ABSTRACT

One problem associated with aircraft using variable cycle engines is how to provide an air intake which is sufficiently large to be able to supply air to both the first and second compressors of the engine during the parallel flow mode and sufficiently small to minimize aerodynamic drag when the engines are operated in the tandem flow mode during supersonic forward flight. This invention overcomes this problem by providing an air intake which combines a blocker door covering a second portion of the duct which communicates with the second compressor and a means of varying the inlet area of the duct such that the area is maximized when the engines are required to operate in the parallel flow mode and minimized during series flow operation.

4 Claims, 4 Drawing Sheets

VARIABLE AREA AIRCRAFT AIR INTAKE

This invention relates to variable cycle gas turbine engines, and in particular to air intakes for selectively changing the direction of flow of the working fluid into the engine.

The present invention is particularly concerned with variable cycle engines of the type generally disclosed in U.S. Pat. Nos. 3,913,321 or 4,038,818 (assigned to Rolls-Royce plc). In general, these engines comprise a first axial flow compressor, a core engine comprising, in flow series, a second compressor, combustion equipment and turbines to drive the first and second compressors, and the engine is capable of operating in two distinct modes. These modes are namely a "series flow" mode and a "parallel flow" mode. In a series flow mode the first and second compressors are connected in flow series and the whole output flow of the first compressor supercharges the second compressor. In the parallel flow mode the output flow from the first compressor is prevented from supercharging the second compressor and is discharged to ambient air through either a by-pass duct or through fixed or vectorable discharge nozzles, whilst simultaneously an auxilliary air intake is opened to allow air to enter the second compressor.

One major problem associated with an aircraft which incorporates engines of the above type is how to provide an air intake which is large enough to supply sufficient air to both the first and second compressors during the parallel mode of operation and small enough to reduce aerodynamic drag to a minimum during supersonic forward flight when the engines operate in series flow mode.

This invention attempts to overcome the above mentioned problems by providing an air intake which is capable of altering its intake area in accordance with the engine airflow requirements and which minimises its frontal area and hence drag during supersonic forward flight.

The present invention will now be more particularly described by way of example only with reference to the accompanying drawings, in which.

Figure 1:
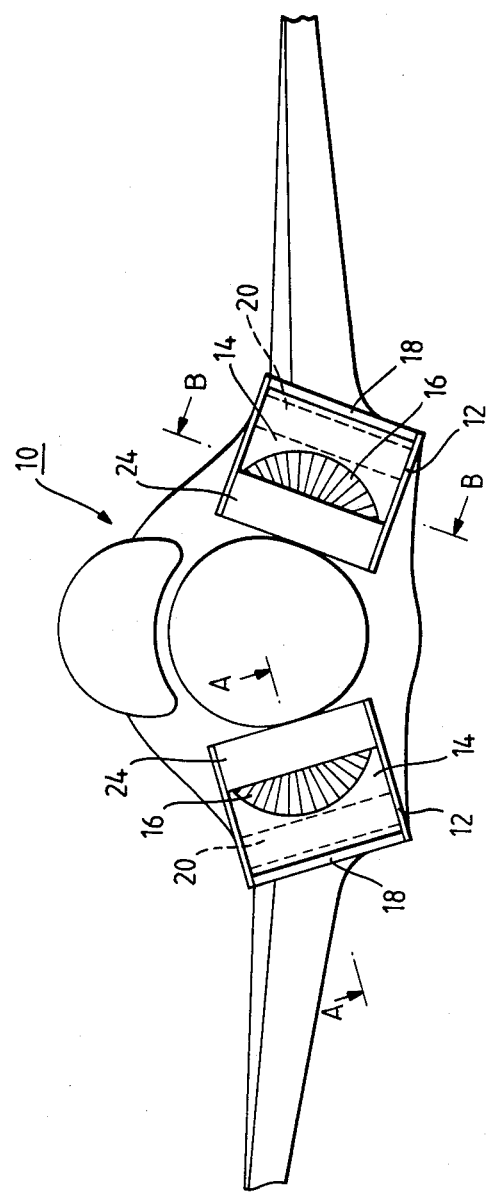
FIG. 1 is a front elevation of an aircraft incorporating the present invention.
Figure 2:
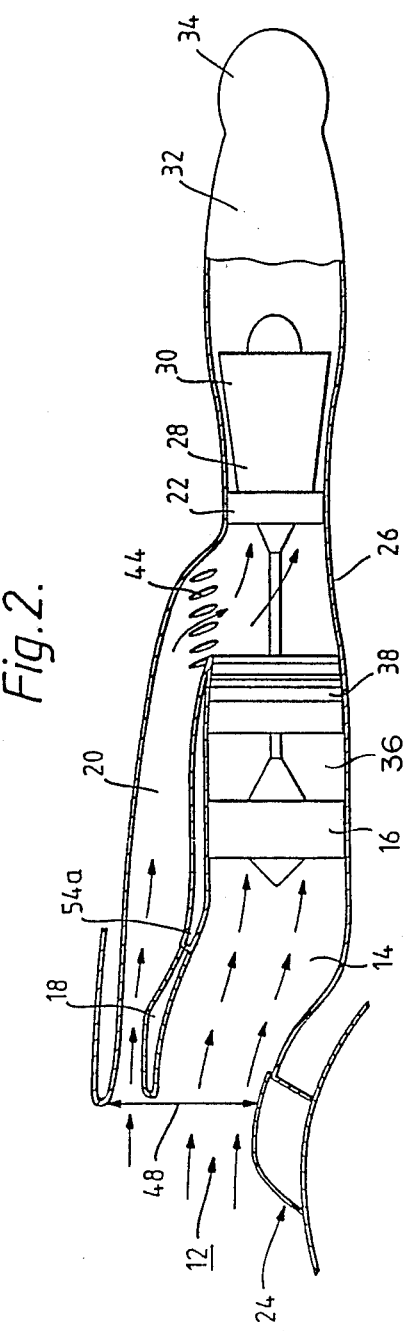
FIG. 2 is a cross sectional view of a twin fan engine and the air intake taken in the direction of arrows A—A in FIG. 1, and shows the engine operating in the parallel flow mode.

Referring to FIGS. 1 and 2, an aircraft shown generally at (10) is provided with at least one air intake (12) having an inlet opening (48) and a first and second duct area (14 and 20) respectively, an obturator door (18) which acts to cover and uncover a second duct (20) which supplies air to a second axial flow compressor (2) and an intake area varying mechanism shown generally at (24).

Figure 3:
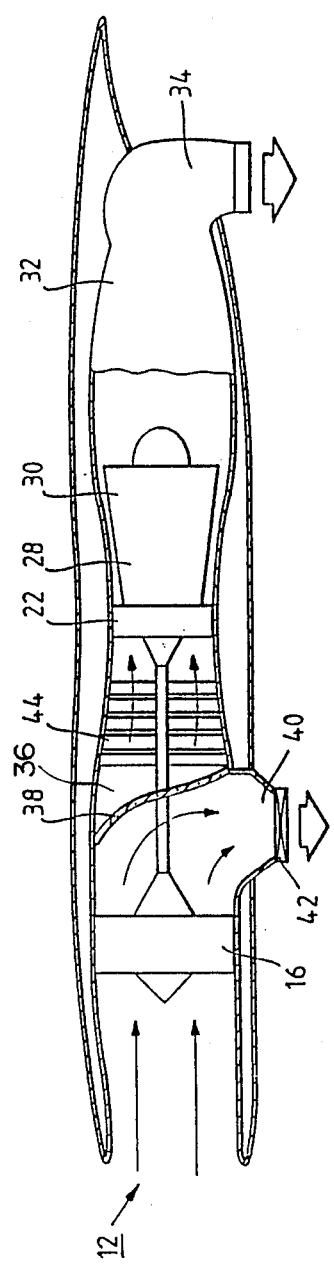
FIG. 3 is a cross-sectional view of an engine and its associated air intake, taken in the direction of arrow B—B in FIG. 1.

Referring now to FIGS. 2 and 3, the engine shown generally at (26) comprises a first axial flow compressor (16) and a core engine comprising a second axial flow compressor (22) combustion equipment (28) and turbine means (30) to drive the first and second compressors (16 and 22) respectively. An exhaust duct (32) having a vectorable rear nozzle (34) is provided downstream of the turbine means (30). The first and second axial flow compressors (16 and 22) are spaced apart from each other by a chamber (36), an upstream end of which is provided with a means, such as for example the venetian blind arrangement shown at (38), for directing air from the first compressor (16) to either the second compressor (22) or to a vectorable exhaust nozzle (40). The nozzle (40) is provided with an obturator means (42) which acts to obturate the nozzle in the series flow mode. The downstream end of the second duct (20) communicates with the downstream end of the chamber (36) and is provided with a means (44) for obturating the duct (20) when the engine is operated in the series flow mode.

Figure 4:
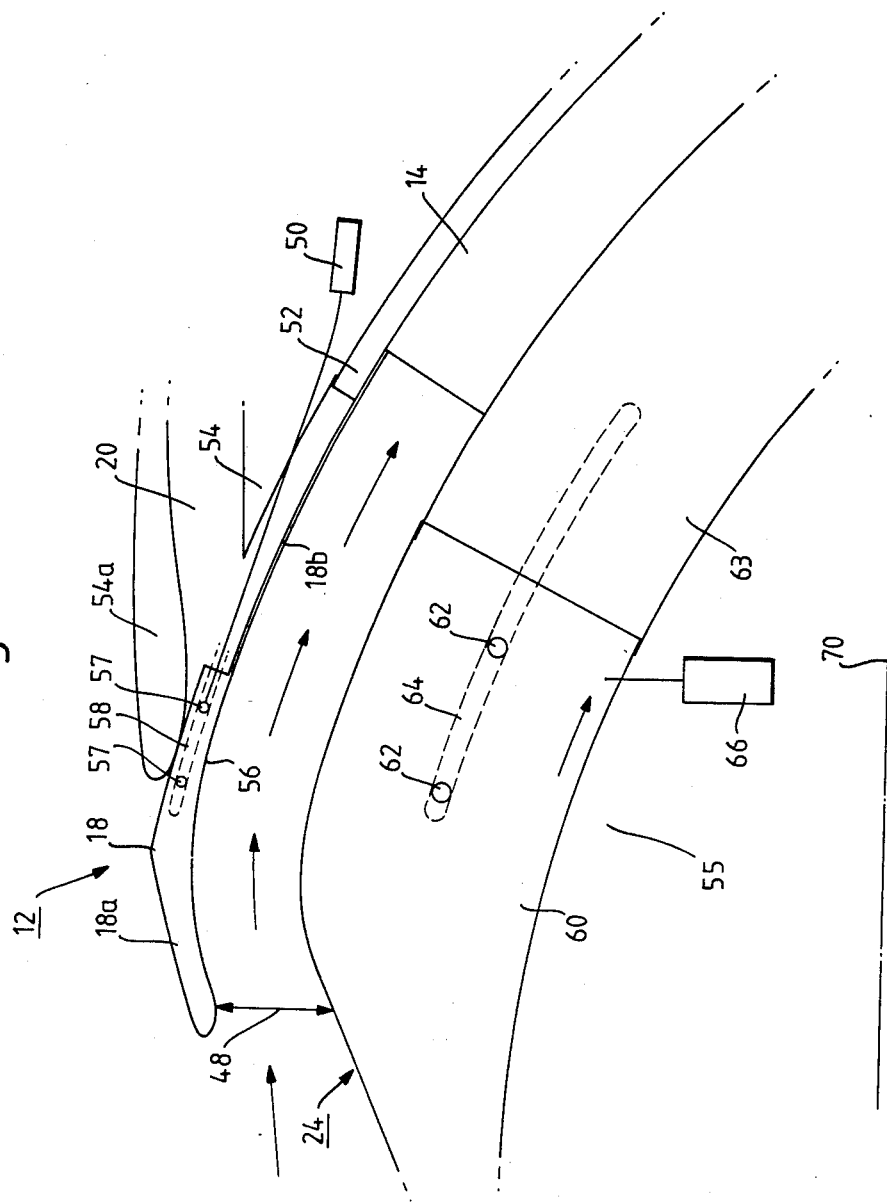
FIG. 4 is an enlarged cross sectional view of the intake shown in FIG. 3 in its series flow position.
Figure 5:
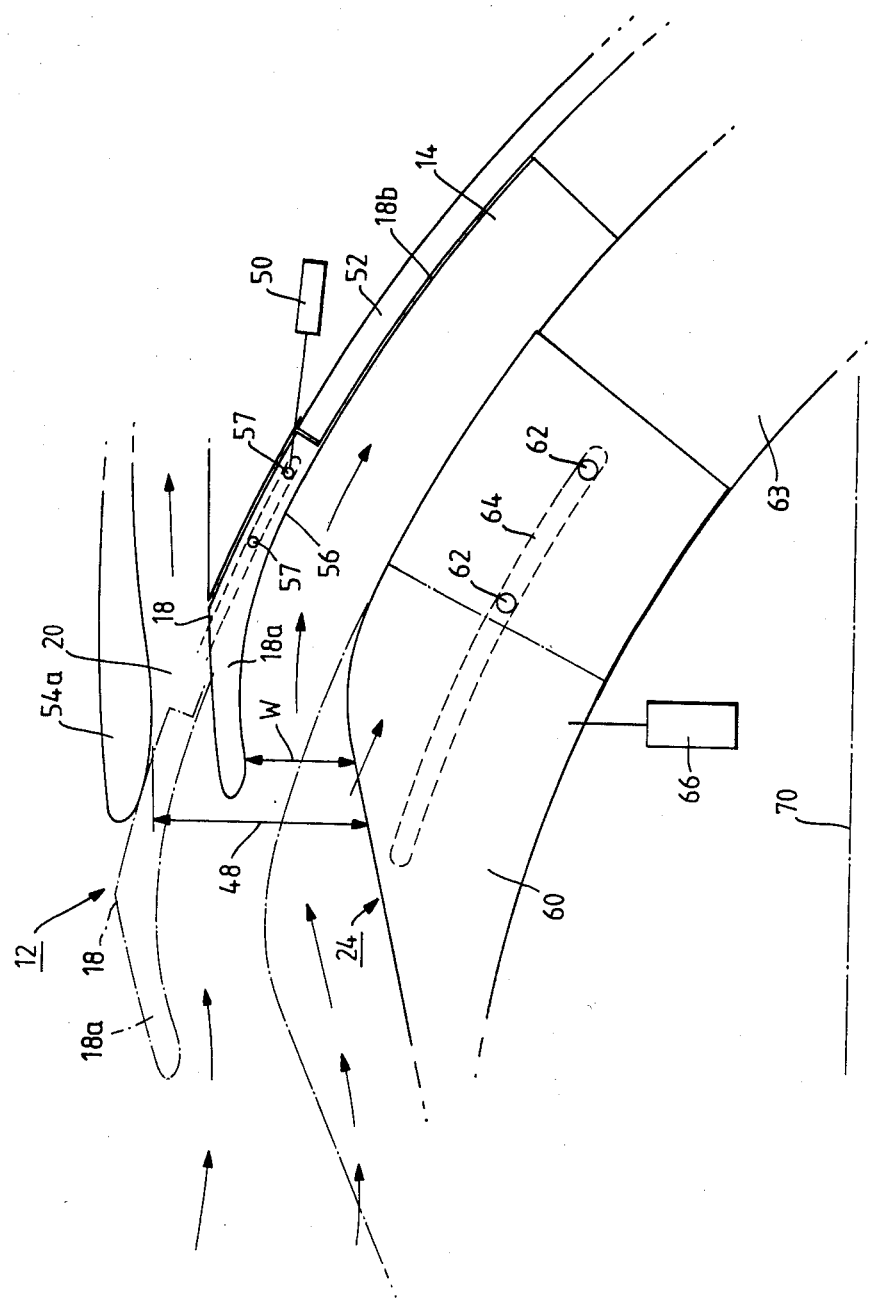
FIG. 5 is an enlarged cross sectional view of the intake shown in FIG. 3 in its parallel flow position.

Referring now particularly to FIGS. 4 and 5, the intake shown generally at (12) comprises an inlet opening (48) which communicates with an inlet duct having a first and a second portion (14,20) respectively, the first portion (14) being positioned to communicate with the first compressor (16) and the second portion (20) being positioned to communicate with the second compressor (22) and a blocker door (18).

The blocker door (18) is situated at the upstream end of the ducts' second portion (20) and comprises a main upstream portion (18a) and an elongated downstream portion (18b). The outside edge of the downstream portion (18b) is indented by an amount equivalent to the thickness of a step (52) formed in an adjacent portion of the duct wall (54), whilst the inner edge (56) acts to define the outer wall of the ducts first portion (14). The door (18) may be provided with a pair of rollers (57) which are positioned to communicate with a track (58) formed in a fixed position of the duct wall (54). In operation, the rollers (57) allow the door (18) to be moved from a first deployed position where it acts to obturate the second portion (20) to a second retracted position in which it uncovers the second portion (20).

In the first position of the door (18) (FIG. 4), the upstream portion (18a) acts to define the outer and leading edge of the duct (12) and in its second position, in which it is retracted inwardly and rearwardly, it acts as a flow splitting element between the first and second portion (14,20) of the duct whilst the radially outermost portion of the duct wall (54) defines the outer and leading edge of the duct (12) and the outer edge of the second portion (20). In its second position the intended section of the door (18) nestles against the step (52) and seals the gap therebetween.

In both positions of the door (18), the inner edge of the duct (12) is defined by an area varying mechanism shown generally at (24). The mechanism comprises a movable upstream portion (60) and a fixed downstream portion (63) over which the movable portion (60) is partially situated. The movable portion (60) may be provided with rollers (62) which communicate with a track (64) formed in a fixed inner portion of the aircraft fuselage (55). In operation the rollers allow the movable portion (60) to be translated rearwardly and inwardly from a first, deployed, forward position (FIG. 4) to a second, retracted, rearward position (FIG. 5). Actuation means shown schematically at (66) but well known per se are provided to translate the movable portion (60) between said positions.

In order to allow the engine (26) to operate in the series flow mode, both the blocker door and the movable portion (60) of the area varying mechanism (24) are moved to their first position (FIG. 4). This allows all the air entering the intake (12) to be directed to the first compressor (16) via the first portion of the duct (14) whilst the second duct portion (20) is obturated by the blocker door (18). The engine (26) may be operated in the parallel flow mode by moving the blocker door (18) and movable portion (60) to their second positions (FIG. 5). In this position, the door (18) acts as a flow splitting element and effectively directs a portion of the air entering the inlet opening (48) to both the first and second portions of the duct (14,20) respectively. Preferably, the shape of the movable portion (60) is profiled to match the contours of the doors inner edge (56) and angled to move relative to the aircrafts longitudinal centre line (70) such that the cross sectional width W of the first duct (14) remains substantially the same in either mode of operation whilst the effective area of the inlet opening (48) is increased between the first and second position of the moving portion (60). The increase in inlet area is caused by the radially inward component of the moving portions (60) motion and is used to accommodate the extra airflow required for the second portion of the duct (2) which supplies the second compressor (22).

It will be appreciated that the increase in the area of the inlet opening (48), when the engine (26) is operated in the parallel flow mode, will have little effect on the drag associated with it as the aircraft (10) will have little or no forward velocity when the engine (26) is operated in this mode.

In the above examples, means 38, 42 and 44 are provided for opening and closing respectively the duct between said first and second compressors 16 and 22, the nozzle 40, and the auxilliary intake (duct 20). It is to be understood that other means may be used, such as for example the sleeve valve—and blocker doors—of the arrangement described in our British Patent application No. 2145160 and in the U.S. patent having the Ser. No. 523,056.

We claim:

1. An aircraft air intake for supplying air to a first compressor and a second compressor of a gas turbine engine capable of operating in either a series flow mode or a parallel flow mode, the air intake comprising:
    an inlet opening;
    an inlet duct, which communicates with the inlet opening and which has a first portion which communicates with the first compressor and a second portion which communicates with the second compressor;
    an obturator door, which in a first position acts to obturate the second portion and in a second position acts to uncover the second portion; and
    a means for altering the area of the inlet opening in accordance with the airflow requirements comprising a movable member which is angled relative to the longitudinal axis of the aircraft and is movable radially inwardly and axially rearwardly from a first position in which it reduces the area of the inlet opening, to a second position in which it increases the area of the inlet opening.

2. An aircraft air intake as claimed in claim 1 in which the movable member is provided with a fixed downstream portion which acts to define the inner edge of the first duct portion and over which the movable portion passes between its first and second positions.

3. An aircraft air intake as claimed in claim 1 in which the obturator door is moved radially inwardly and axially rearwardly between its first and its second position.

4. An aircraft air intake as claimed in claim 1 in which the obturator door acts to obturate the second portion of the inlet duct when the movable member is in its first position and acts to uncover the second portion of the inlet duct when the movable member is in its second position.

* * * * *